(12) United States Patent
Gupta et al.

(10) Patent No.: US 10,344,103 B2
(45) Date of Patent: Jul. 9, 2019

(54) ZIEGLER-NATTA CATALYST COMPOSITION FOR PREPARING POLYETHYLENE

(71) Applicant: RELIANCE INDUSTRIES LIMITED, Mumbai (IN)

(72) Inventors: Virendrakumar Gupta, Mumbai (IN); Hiren Manojkumar Bhajiwala, Surat (IN); Sunil Dhamaniya, Jaipur (IN); Amarjyoti Kalita, Kamrup district (IN); Ramesh Joshi, Pune (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/510,665

(22) PCT Filed: Sep. 11, 2015

(86) PCT No.: PCT/IB2015/056962
§ 371 (c)(1),
(2) Date: Mar. 10, 2017

(87) PCT Pub. No.: WO2016/038570
PCT Pub. Date: Mar. 17, 2016

(65) Prior Publication Data
US 2017/0306061 A1    Oct. 26, 2017

(30) Foreign Application Priority Data
Sep. 11, 2014    (IN) .......................... 2896/MUM/2014

(51) Int. Cl.
| | | |
|---|---|---|
| *C08F 4/654* | (2006.01) | |
| *C08F 4/02* | (2006.01) | |
| *C08F 2/14* | (2006.01) | |
| *C08F 4/76* | (2006.01) | |
| *B01J 31/02* | (2006.01) | |

(52) U.S. Cl.
CPC .............. *C08F 4/654* (2013.01); *B01J 31/02* (2013.01); *C08F 2/14* (2013.01); *C08F 4/02* (2013.01); *C08F 4/76* (2013.01)

(58) Field of Classification Search
None
See application file for complete search history.

(56) References Cited

U.S. PATENT DOCUMENTS

| | | | |
|---|---|---|---|
| 4,399,054 A * | 8/1983 | Ferraris | C08F 4/022 |
| | | | 502/125 |
| 5,773,537 A | 6/1998 | Mueller et al. | |
| 6,559,249 B2 | 5/2003 | Yang et al. | |
| 2001/0012908 A1 * | 8/2001 | Tanase | C08F 4/6565 |
| | | | 568/851 |
| 2005/0107539 A1 * | 5/2005 | Ferraro | C08F 10/00 |
| | | | 525/240 |
| 2006/0046928 A1 * | 3/2006 | Klendworth | C08F 10/00 |
| | | | 502/103 |
| 2006/0287449 A1 | 12/2006 | Miyamoto et al. | |
| 2014/0005337 A1 * | 1/2014 | Hallot | C08L 23/142 |
| | | | 525/240 |
| 2014/0031608 A1 | 1/2014 | Osann, Jr. | |
| 2014/0148565 A1 * | 5/2014 | Denkwitz | C08F 10/00 |
| | | | 526/129 |
| 2014/0243475 A1 * | 8/2014 | Mavridis | C08L 23/06 |
| | | | 525/53 |

OTHER PUBLICATIONS

Dashti et al., "Kinetic and morphological study of a magnesium ethoxide-based Ziegler-Natta catalyst for propylene polymerization," Polym. Int. 2009; 58, 40-45. (Year: 2009).*
Senso et al., "Behaviors in Ethylene Polymerization of $MgCl_2$—$SiO_2/TiCl_4$/THF Ziegler-Natta Catalysts with Differently Treated $SiO_2$," Molecules 2011, 16, 1323-1335. (Year: 2011).*

* cited by examiner

*Primary Examiner* — Catherine S Branch
(74) *Attorney, Agent, or Firm* — Fish IP Law, LLP

(57) ABSTRACT

The Zigler-Natta catalyst composition of the present disclosure provides uniform polyethylene having a molecular weight in the range from 1 million g/mol to 12 million g/mol. The Zigler-Natta catalyst composition of the present disclosure comprises external electron donor selected from the group consisting of substituted silanediyl diacetate, trialkyl borate and tetraalkoxysilane.

8 Claims, 1 Drawing Sheet

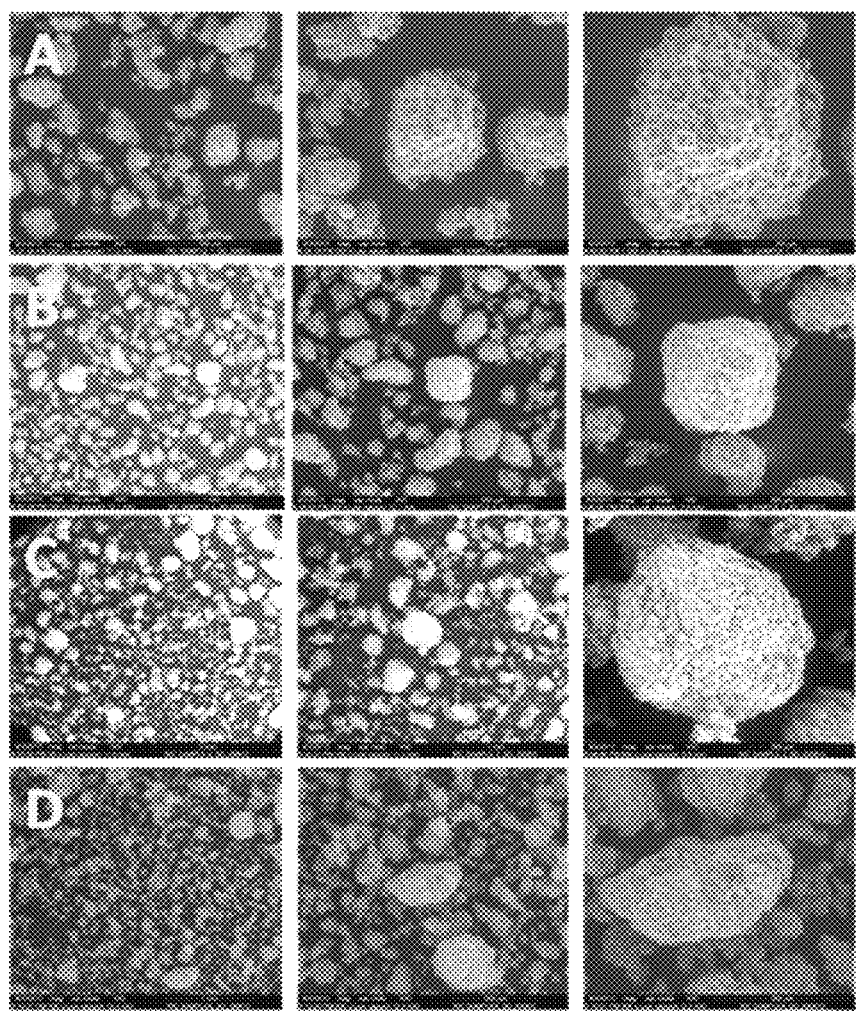

ZIEGLER-NATTA CATALYST COMPOSITION FOR PREPARING POLYETHYLENE

FIELD

The present disclosure relates to Ziegler-Natta catalyst compositions.

BACKGROUND

Polyethylene is a commercially important polymer used for various applications. Polyethylene having high density and a molecular weight greater than 4 million g/mol is termed Ultra High Molecular Weight Polyethylene (UHMWPE). UHMWPE articles display resistance to wear and impact. UHMWPE is used for numerous applications including manufacture of automobile parts, defense applications and medical devices.

Polyethylene is commonly prepared on an industrial scale by polymerization of ethylene in the presence of a Ziegler-Natta catalyst composition. The components of the Ziegler-Natta catalyst composition affect the productivity of the polymerization as well as properties of the polymer such as molecular weight, bulk density, intrinsic viscosity, crystallinity and average particle size.

The art continues to develop Ziegler-Natta catalyst compositions that produce polyethylene having desired properties in a cost-effective manner.

Thus, there is a need to provide a Ziegler-Natta catalyst composition that produces polyethylene having desired properties in a cost effective manner.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide Ziegler-Natta catalyst compositions for preparation of polyethylene, particularly UHMWPE having the desired properties.

Another object of the present disclosure is to provide Ziegler-Natta catalyst compositions for preparation of polyethylene, particularly UHMWPE having desired properties in a cost effective manner.

Other objects and advantages of the present disclosure will be more apparent from the following description, which is not intended to limit the scope of the present disclosure.

SUMMARY

The present disclosure relates to a Ziegler-Natta catalyst composition for preparing polyethylene. The catalyst composition of the present disclosure comprises a pro-catalyst comprising a magnesium component and a titanium component, an organo-aluminum co-catalyst, and at least one external electron donor selected from the group consisting of substituted silanediyl diacetate, trialkyl borate and tetraalkoxysilane.

The Ziegler-Natta catalyst composition of the present disclosure is used for the preparation of polyethylene. Polyethylene prepared using the catalyst composition of the present disclosure posseses molecular weight in the range of 1 million g/mol to 12 million g/mol, particularly UHMWPE having a molecular weight in the range of 4 million g/mol to 12 million g/mol.

The Ziegler-Natta catalyst composition of the present disclosure has uniform shape and it produces polyethylene resins of uniform shape.

BRIEF DESCRIPTION OF THE ACCOMPANYING DRAWINGS

A Ziegler-Natta catalyst composition will now be described with the help of the accompanying drawings, in which:

FIG. 1(A) depicts SEM images of polyethylene prepared under donor free conditions.

FIG. 1(B) depicts SEM images of polyethylene prepared using Diethyl 2,2'-(dimethylsilanediyl)diacetate (DSD-1).

FIG. 1(C) depicts SEM images of polyethylene prepared using Diethyl 2,2'-(phenyl(methyl)silanediyl)diacetate (DSD-2).

FIG. 1(D) depicts SEM images of polyethylene prepared using Diethyl 2,2'-(diisopropylsilanediyl)diacetate (DSD-3).

DETAILED DESCRIPTION

The present disclosure relates to preparation of polyethylene, particularly ultra-high molecular weight polyethylene (UHMWPE) having a molecular weight greater than 4 million g/mol. In order to prepare the UHMWPE of desired molecular weight, a catalyst is required, which comprises a suitable procatalyst and an external electron donor.

Further, the catalyst compositions of the present disclosure lead to the formation of polyethylene with uniform shape.

In accordance with an aspect of the present disclosure, the present disclosure provides a Ziegler-Natta catalyst composition comprising:
i. a pro-catalyst comprising a magnesium component and a titanium component;
ii. an organo-aluminum co-catalyst; and
iii. at least one external electron donor selected from the group consisting of substituted silanediyl diacetate, trialkyl borate and tetraalkoxysilane.

In accordance with the embodiments of the present disclosure, the titanium component is at least one selected from the group including, but not limited to, Ti metal, $Ti(OH)_3Cl$, $Ti(OH)_2Cl_2$, $Ti(OH)Cl_3$, titanium trichloride, and titanium tetrachloride. The amount of titanium component is calculated in the form of elemental titanium.

The titanium component is the active component of the catalyst which polymerizes ethylene to produce polyethylene.

In accordance with the embodiments of the present disclosure, the magnesium component is at least one magnesium compound selected from the group consisting of magnesium alkoxide and magnesium chloride. The magnesium alkoxide is at least one selected from a group consisting of magnesium methoxide, magnesium ethoxide, magnesium iso-propoxide, magnesium propoxide, magnesium butoxide and magnesium 2-butoxide.

The active component of the catalyst, i.e. titanium component, is supported on the magnesium component of the procatalyst. The morphology of the procatalyst is directed by the magnesium component.

The morphology of the procatalyst is replicated in the polyethylene resin via the catalyst composition. Uniform morphology gives better flowability to the polyethylene resin.

The procatalyst, used for the preparation of Ziegler-Natta catalyst composition of the present disclosure, is of uniform shape, which helps to produce polyethylene with uniform shape. This results in lower downstream maintenance cost. Therefore, the process of the present disclosure is cost effective.

In accordance with the embodiments of the present disclosure, the pro-catalyst is in the form of spheroidal magnesium alkoxide.

In accordance with the embodiments of the present disclosure, the pro-catalyst is supported on silica.

In accordance with the embodiments of the present disclosure, the ratio of the amount of silica to the amount of magnesium component ranges from 1:10 to 1:30.

These two forms of the pro-catalyst provide uniform Ziegler-Natta catalyst compositions which lead to the formation of uniform polymer resins.

In accordance with the embodiments of the present disclosure, the organo-aluminum co-catalyst is at least one selected from the group consisting of triethylaluminum, tridecylaluminum, tri-n-butylaluminum, tri-isopropylaluminum, tri-isoprenylaluminum, tri-isobutylaluminum, ethyl aluminum sesquichloride, diethylaluminum chloride, di-isobutyl aluminum chloride, triphenylaluminum, tri-n-octylaluminum and tri-n-decylaluminum.

In accordance with the embodiments of the present disclosure, the ratio of the amount of the organo-aluminum co-catalyst to the amount of elemental titanium ranges from 500:1 to 10:1.

In accordance with one embodiment of the present disclosure, the ratio of the amount of the organo-aluminum co-catalyst to the amount of elemental titanium is 100:1.

In accordance with another embodiment of the present disclosure, the ratio of the amount of the organo-aluminum co-catalyst to the amount of elemental titanium is 250:1.

In accordance with the embodiments of the present disclosure, the ratio of the amount of the organo-aluminum co-catalyst to the amount of the external electron donor ranges from 1:1 to 50:1.

In accordance with the embodiments of the present disclosure, the substituted silanediyl diacetate is at least one selected from the group consisting of diethyl-2,2'-(dimethylsilanediyl)diacetate; diethyl-2,2'-(phenyl(methyl)silanediyl)diacetate and diethyl-2,2'-(diisopropylsilanediyl)diacetate.

In accordance with the embodiments of the present disclosure, the trialkyl borate is at least one selected from the group consisting of triethyl borate and trimethyl borate.

In accordance with one embodiment of the present disclosure, the trialkyl borate is triethyl borate.

In accordance with the embodiments of the present disclosure, the tetraalkoxy silane is at least one selected from the group consisting of tetramethoxysilne, tetraethoxy silane, cyclohexylmethyldimethoxysilane, dicyclopentyldimethoxysilane, diethyldiethoxysilane, diisobutyldimethoxysilane.

In accordance with one embodiment of the present disclosure, the tetralkoxysilane is tetraethoxysilane (TEOS).

In the second aspect of the present disclosure, there is provided a process for ethylene polymerization in the presence of the Ziegler-Natta catalyst composition of the present disclosure. The process comprises preparing a slurry of the Ziegler-Natta catalyst composition in a hydrocarbon solvent in a reactor. Ethylene is introduced in the reactor to attain a predetermined pressure followed by subjecting ethylene to polymerization at a temperature ranging from 50° C. to 100° C. for a time period ranging from 10 minutes to 120 minutes to obtain polyethylene.

In accordance with the embodiments of the present disclosure, the predetermined pressure of ethylene ranges from 3 $Kg/cm^2$ to 10 $Kg/cm^2$.

In accordance with one embodiment of the present disclosure, the predetermined pressure of ethylene may be 6 $Kg/cm^2$.

Using the process of the present disclosure, UHMWPE having a molecular weight in the range from 4 million g/mol to 12 million g/mol is obtained.

In accordance with the embodiments of the present disclosure, the polymerization is carried out in the presence of a chain transfer agent such as hydrogen gas.

Using the process of the present disclosure, polyethylene having a molecular weight in the range from 1 million g/mol to 4 million g/mol is obtained in the presence of hydrogen gas as chain transfer agent. It is found that the use of one or more external electron donors prevents the chain termination of the growing polymer chain in a far better way as compared to 'donor free' system. This feature leads to higher molecular weight.

In accordance with one aspect of this disclosure, the productivity of one embodiment of the catalyst i.e. the spheroidal magnesium alkoxide based catalyst composition can be increased by using diethyl phthalate as the internal electron donor.

The disclosure will now be described with reference to the following laboratory experiments which do not limit the scope and ambit of the disclosure. The description provided is purely by way of example and illustration.

The laboratory scale experiments provided herein can be scaled up to industrial or commercial scale.

Example 1: Ethylene Polymerization Using Spheroidal Magnesium Based Pro-Catalyst and Substituted Silanediyl Diacetate Compounds as External Electron Donors Pro-catalyst based on spheroidal magnesium alkoxide precursor containing ethyl benzoate as internal donor was modified by the application of substituted silanediyl diacetate compounds as external electron donors to produce Ziegler-Natta catalyst compositions.

These catalyst compositions were used for the polymerization of ethylene to obtain polyethylene using the ratio of organoaluminum compound to elemental titanium (Al/Ti) of 250 and organoaluminum compound to the external electron donor (Al/ED) of 5. These experiments were carried out at an ethylene pressure of 6 $Kg/cm^2$.

For comparison, the polymerization was also carried out without using an external electron donor, i. e. donor free conditions.

The results are provided herein below in Table 1. DSD1 is Diethyl 2,2'-(dimethylsilanediyl)diacetate; DSD2 is Diethyl 2,2'-(phenyl(methyl)silanediyl)diacetate; and DSD3 is Diethyl 2,2'-(diisopropylsilanediyl)diacetate.

TABLE 1

Ethylene polymerization using spheroidal magnesium alkoxide based pro-catalyst and substituted silanediyl diacetate compounds as external electron donors

| Run No. | ED | TEAl/ ED | Activity (Kg · PE/g cat) | BD (g/cc) | APS (μm) | $M_v$ (million g/mol) | $[\eta]_{in}$ (dl/g) | $X_c$ (%) |
|---|---|---|---|---|---|---|---|---|
| 1 | Donor Free | — | 8.5 | 0.41 | 185 | 1.7 | 10.5 | 56 |
| 2 | DSD1 | 5 | 1.0 | 0.33 | 224 | 6.0 | 24.0 | 61 |
| 3 | DSD2 | 5 | 1.8 | 0.38 | 200 | 6.8 | 26.0 | 62 |
| 4 | DSD3 | 5 | 3.8 | 0.35 | 181 | 6.6 | 25.3 | 60 |

Key:
ED: External electron donor;
TEAl/ED = Triethylaluminum and electron donor ratio (mol/mol);
BD: Bulk density;
APS = Average article size;
$[\eta]_{in}$ = intrinsic viscosity;
$X_c$ = crystaliinity.

The UHMWPE was obtained using spheroidal magnesium alkoxide based pro-catalyst and substituted silanediyl diacetate compounds as external electron donors.

The molecular weight of UHMWPE was found to be in the range from 6.0 million g/mol to 6.8 million g/mol.

In contrast, under donor free conditions (Run-1), polyethylene having 1.7 million g/mol was obtained.

It is evident that the substituted silanediyl diacetate compounds used as external electron donors exert a significant effect on the molecular weight of the polymer.

The improved catalyst compositions have less number of active centers in the catalyst at the time of polymerization as compared to 'donor free' system.

However, at the same time it prevents the chain termination of the growing polymer chain in a far better way as compared to 'donor free' system that in-turn significantly increases the molecular weight. It indicates that modified catalyst composition has lesser tendency for formation of α-oligomers such as 1-butene which are accountable for chain termination of growing polymer chains.

Interestingly, in case of DSD3 the presence of bulkier isopropyl substitution not only prevents the chain termination at the active center, but also allows the presence of abundant number of active centres. This is reflected in terms of increased productivity of the polymer as well as molecular weight as compared to DSD1 and DSD2.

Further, it was observed that, the crystallinity of UHMWPE was found to be in the range from 60% to 62%, which was higher than that of polyethylene produced under donor free conditions.

An increase in % crystallinity indicates that UHMWPE synthesized by improved catalyst composition has a less degree of entanglement as compared to 'donor free' composition.

It was observed that, the average particle size (APS) of polymer resin decreased as the bulkiness of donor increased. The morphological images of polymer resins are shown in FIG. 1.

Example 2: Ethylene Polymerization Using Spheroidal Magnesium Based Pro-Catalyst and Triethyl Borate as External Electron Donors Pro-catalyst based on spheroidal magnesium alkoxide precursor containing ethyl benzoate as internal donor was modified by the application of triethyl borate as an external electron donor to produce Ziegler-Natta catalyst compositions.

These catalyst compositions were used for the polymerization of ethylene to obtain polyethylene using the ratio of organoaluminum compound to elemental titanium (Al/Ti) of 250 and organoaluminum compound to external electron donor (Al/ED) in the range of 20:1 to 30:1. These experiments were carried out at an Ethylene pressure of 6 Kg/cm$^2$. The results are shown in Table 2.

TABLE 2

Ethylene polymerization using spheroidal magnesium alkoxide based pro-catalyst and triethoxyborate as an external electron donor

| Run No. | ED | Al/ ED | Activity (Kg · PE/g cat) | BD (g/cc) | APS (μm) | $M_v$ (million g/mol) | $[\eta]_{in}$ (dl/g) | $X_c$ (%) |
|---|---|---|---|---|---|---|---|---|
| 1 | Triethyl borate | 20 | 5.6 | 0.30 | 167 | 4.9 | 20.7 | 55 |
| 2 | Triethyl borate | 30 | 6.8 | 0.35 | 174 | 4.1 | 18.4 | 56 |

Key:
ED: External electron donor;
TEAl/ED = Triethylaluminum and electron donor ratio (mol/mol);
BD: Bulk density;
APS = Average article size;
$[\eta]_{in}$ = intrinsic viscosity;
$X_c$ = crystaliinity.

The ultrahigh molecular weight polyethylene (UHMWPE) was obtained as a result of use of trialkylborate as an external electron donor. The molecular weight of UHMWPE was found to be the range from 4.1 million g/mol to 4.9 million g/mol.

Thus, the presence of external electron donors of the present disclosure provides UHMWPE with higher crystallinity.

Further, the productivity of polymerization can be increased by increasing the ratio of the amount of triethylaluminum to the amount of the trialkoxyborate.

Example 3

Pro-catalyst based on spheroidal magnesium alkoxide precursor containing diethyl phthalate as internal donor and triethyl borate as an external electron donor to produce Ziegler-Natta catalyst composition.

Thus, the internal electron donor of the pro-catalyst of example 2 was changed from ethyl benzoate to diethyl phthalate.

The experiment was carried out under conditions similar to those used in example 2. The result is shown in Table 3.

TABLE 3

Ethylene polymerization using spheroidal magnesium alkoxide based pro-catalyst and triethoxyborate as an external electron donor

| Run No. | ED | Al/ ED | Activity (Kg · PE/g cat) | BD (g/cc) | APS (μm) | $M_v$ (million g/mol) | $[\eta]_{in}$ (dl/g) | $X_c$ (%) |
|---|---|---|---|---|---|---|---|---|
| 1 | Triethyl borate | 20 | 6.4 | 0.33 | 160 | 8.0 | 29.0 | 56.0 |

Key:
ED: External electron donor;
TEAl/ED = Triethylaluminum and electron donor ratio (mol/mol);
BD: Bulk density;
APS = Average article size;
$[\eta]_{in}$ = intrinsic viscosity;
$X_c$ = crystaliinity.

Employing diethyl phthalate as an internal electron donor resulted in an increase in the molecular weight of the UHMWPE and productivity.

Example 4: Ethylene Polymerization Using Silica Supported Pro-Catalyst and Tetraethoxysilane as an External Electron Donor Silica supported pro-catalyst was modified by the application of tetraethylorthosilicate as an external electron donor to produce Ziegler-Natta catalyst compositions.

These catalyst compositions were used for the polymerization of ethylene to obtain polyethylene using the ratio of organoaluminum compound to elemental titanium (Al/Ti) of 100 and organoaluminum compound to external electron donor (Al/ED) in the range of 2:1 to 20:1. These experiments were carried out at an ethylene pressure of 6 Kg/cm². The results are shown in Table 4.

TABLE 4

Ethylene polymerization using Si—Mg—Ti pro-catalyst and tetraethoxysilane as an external electron donor

| Run No. | Al/ Ti | Al/ ED | Activity (Kg · PE/g cat) | $M_v$ (million g/mol) | BD (g/cc) | APS (μm) | $X_c$ (%) |
|---|---|---|---|---|---|---|---|
| 1 | 100 | 2 | 0.5 | 11.0 | 0.29 | 240 | 52 |
| 2 | 100 | 10 | 1.0 | 8.1 | 0.37 | 216 | 48 |
| 3 | 100 | 20 | 2.6 | 6.0 | 0.45 | 185 | 52 |

Key:
ED: External electron donor;
Al/ED = Triethylaluminum and electron donor ratio (mol/mol);
BD: Bulk density;
APS = Average article size;
$[\eta]_{in}$ = intrinsic viscosity;
$X_c$ = crystaliinity.

The UHMWPE was obtained using silica supported pro-catalyst and TEOS as an external electron donor. The molecular weight of UHMWPE was found to be in the range from 6.0 million g/mol to 11.0 million g/mol.

Further, it was found that the productivity of the Ziegler-Natta catalyst composition and the bulk density of the UHMWPE increase with increasing concentration of the external electron donor.

Example 5: Ethylene Polymerization Using Silica Supported Pro-Catalyst and Triethylborate as an External Electron Donor Silica supported pro-catalyst was modified by the application of triethylborate as an external electron donor to produce Ziegler-Natta catalyst compositions.

These catalyst compositions were used for the polymerization of ethylene to obtain polyethylene using the ratio of organoaluminum compound to elemental titanium (Al/Ti) of 100 and organoaluminum compound to external electron donor (Al/ED) in the range of 10:1 to 40:1. These experiments were carried out at an Ethylene pressure of 6 Kg/cm². The results are shown in Table 5.

TABLE 5

Ethylene polymerization using using silica supported pro-catalyst and trialkoxyborate as an external electron donor

| Run No. | Al/ Ti | Al/ D | Activity (Kg · PE/g cat) | $M_v$ (million g/mol) | BD (g/cc) | APS (μm) | $X_c$ (%) |
|---|---|---|---|---|---|---|---|
| 1 | 100 | 10 | 0.2 | 11.7 | 0.30 | 222 | 47 |
| 2 | 100 | 30 | 3.0 | 8.4 | 0.36 | 183 | 50 |
| 3 | 100 | 40 | 4.2 | 6.6 | 0.45 | 190 | 50 |

Key:
ED: External electron donor;
Al/ED = Triethylaluminum and electron donor ratio (mol/mol);
BD: Bulk density;
APS = Average article size;
$[\eta]_{in}$ = intrinsic viscosity;
$X_c$ = crystaliinity.

The UHMWPE was obtained using silica supported pro-catalyst and trialkoxyborate as an external electron donor. The molecular weight of UHMWPE was found to be in the range from 6.6 million g/mol to 11.7 million g/mol.

Further, it was found that the productivity of the Ziegler-Natta catalyst composition and the bulk density of the UHMWPE increase with increasing concentration of the external electron donor.

Ethylene polymerization using the Zifgler-Natta catalyst composition of the present disclosure was carried out using a chain transfer agent such as hydrogen gas.

Example 6: Ethylene Polymerization Using Spheroidal Magnesium Alkoxide Based Pro-Catalyst and Substituted Silanediyl Diacetate Compounds as External Electron Donors in the Presence of Hydrogen Gas as a Chain Transfer Agent The polymerization was carried out using similar procedure as described in Example 1. The results are provided herein below in Table 6. DSD1 is Diethyl 2,2'-(dimethylsilanediyl)diacetate; DSD2 is Diethyl 2,2'-(phenyl(methyl)silanediyl)diacetate; and DSD3 is Diethyl 2,2'-(diisopropylsilanediyl)diacetate.

TABLE 6

Ethylene polymerization using spheroidal magnesium alkoxide based pro-catalyst and substituted silanediyl diacetate compounds as external electron donors

| Run No. | ED | TEAl/ ED | Hydrogen (mL) | Activity (Kg · PE/g cat) | BD (g/cc) | APS (μm) | $M_v$ (million g/mol) | $[\eta]_{in}$ (dl/g) | $X_c$ (%) |
|---|---|---|---|---|---|---|---|---|---|
| 1 | DSD1 | 5 | 0 | 1.0 | 0.33 | 224 | 6.0 | 24.0 | 61 |
| 2 | DSD1 | 5 | 240 | 1.1 | 0.32 | 227 | 2.7 | 13.7 | 59 |
| 3 | DSD1 | 5 | 480 | 1.2 | 0.36 | 238 | 1.5 | 9.1 | 54 |

Key:
ED: External electron donor;
TEAl/ED = Triethylaluminum and electron donor ratio (mol/mol);
BD: Bulk density;
APS = Average article size;
$[\eta]_{in}$ = intrinsic viscosity;
$X_c$ = crystaliinity.

The rate of chain termination at the active center increases with an increase in concentration of chain transfer agent which reflects in decreased molecular weight of polyethylene. It shows that improved catalyst system is capable to produce polyethylene having molecular weight in the range from 1.5 million g/mol to 2.7 million g/mol in same conditions in presence of chain transfer agent, with a less variation in the % crystallinity of the polymer.

Example 7: Ethylene Polymerization Using Spheroidal Magnesium Based Pro-Catalyst and Triethyl Borate as External Electron Donors Using Hydrogen Gas as Chain Transfer Agent Pro-catalyst based on spheroidal magnesium alkoxide precursor containing ethyl benzoate as internal donor was modified by the application of triethyl borate as an external electron donor to produce Ziegler-Natta catalyst compositions.

These catalyst compositions were used for the polymerization of ethylene using the ratio of organoaluminum compound to elemental titanium (Al/Ti) of 250 and organoaluminum compound to external electron donor (Al/ED) of 30:1. These experiments were carried out at an Ethylene pressure of 6 Kg/cm². The results are shown in Table 7.

TABLE 7

Ethylene polymerization using spheroidal magnesium alkoxide based pro-catalyst and triethoxyborate as an external electron donor using hydrogen gas

| Run No. | ED | Al/ ED | Hydrogen (mL) | Activity (Kg · PE/g cat) | BD (g/cc) | APS (μm) | $M_v$ (million g/mol) | $[\eta]_{in}$ (dl/g) | $X_c$ (%) |
|---|---|---|---|---|---|---|---|---|---|
| 1 | Donor free | — | 0 | 8.5 | 0.41 | 185 | 1.7 | 10.5 | 56.1 |
| 2 | Triethyl borate | 30 | 0 | 5.6 | 0.30 | 174 | 4.9 | 20.7 | 55.0 |
| 3 | Triethyl borate | 30 | 240 | 5.8 | 0.36 | 176 | 2.7 | 14.1 | 58.7 |
| 4 | Triethyl borate | 30 | 480 | 6.8 | 0.45 | 183 | 1.3 | 8.7 | 60 |

Key:
ED: External electron donor;
TEAl/ED = Triethylaluminum and electron donor ratio (mol/mol);
BD: Bulk density;
APS = Average article size;
$[\eta]_{in}$ = intrinsic viscosity;
$X_c$ = crystaliinity.

The presence of chain transfer agent enhances the polymer chain transfer that is evident from the decreased molecular weight of polyethylene. This demonstrates that the modified catalyst system using triethyl borate is able to synthesize polyethylene having molecular weight in the range from 1.3 million g/mol to 2.7 million g/mol in the same conditions in the presence of a chain transfer agent.

Example 8: Ethylene Polymerization Using Silica Supported Pro-Catalyst and Triethylborate as an External Electron Donor Using Hydrogen Gas as Chain Transfer Agent Silica supported pro-catalyst was modified by the application of triethylborate as an external electron donor to produce Ziegler-Natta catalyst compositions.

These catalyst compositions were used for the polymerization of ethylene using the ratio of organoaluminum compound to elemental titanium (Al/Ti) of 100 and organoaluminum compound to external electron donor (Al/ED) ratio of 10:1. These experiments were carried out at an ethylene pressure of 6 Kg/cm$^2$. The results are shown in Table 8.

TABLE 8

Ethylene polymerization using Si—Mg—Ti pro-catalyst and tetraethoxysilane as an external electron donor and hydrogen gas

| Run No. | Al/Ti | Al/ED | Hydrogen gas (mL) | Activity (Kg · PE/g cat) | $M_v$ (million g/mol) | BD (g/cc) | APS (μm) | $X_c$ (%) |
|---|---|---|---|---|---|---|---|---|
| 1 | 100 | 10 | 0 | 0.2 | 11.7 | 0.30 | 222 | 47 |
| 2 | 100 | 10 | 240 | 1.1 | 1.9 | 0.40 | 160 | 50 |
| 3 | 100 | 10 | 480 | 0.4 | 1.7 | 0.41 | 166 | 48 |

Key:
ED: External electron donor;
Al/ED = Triethylaluminum and electron donor ratio (mol/mol);
BD: Bulk density;
APS = Average article size;
[η]$_{in}$ = intrinsic viscosity;
$X_c$ = crystaliinity.

The presence of chain transfer agent enhances the polymer chain transfer that evident from the decreased molecular weight of polyethylene. This demonstrates that the modified catalyst system using triethyl borate is able to synthesize polyethylene having molecular weight in the range from 1.7 million g/mol to 1.9 million g/mol in the same conditions in presence of chain transfer agent.

TECHNICAL ADVANCES AND ECONOMICAL SIGNIFICANCE

The Ziegler-Natta catalyst compositions of the present disclosure described herein above has several technical advantages including but not limited to the realization of:
polyehtylene having uniform shape and better flowability;
polyehtylene of desired molecular weight; and
a cost effective process for preparing polyehtylene.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A Ziegler-Natta catalyst composition for preparation of an ultrahigh molecular weight polyolefin, said composition comprising:
   i. a pro-catalyst comprising a magnesium component and a titanium component;
   ii. an organo-aluminum co-catalyst; and
   iii. at least one external electron donor, wherein the at least one external electron donor is a substituted silanediyl diacetate or a trialkyl borate;
   wherein the magnesium component is in the form of a spheroidal magnesium alkoxide; and
   wherein the pro-catalyst is supported on silica and the mole ratio of the amount of silica to the amount of magnesium component ranges from 1:10 to 1:30,
   wherein the substituted silanediyl diacetate is selected from the group consisting of diethyl-2,2'-(dimethylsilanediyl)diacetate; diethyl-2,2'-(phenyl(methyl)silanediyl)diacetate and diethyl-2,2'-(diisopropylsilanediyl)diacetate, and
   wherein the trialkyl borate is selected from the group consisting of triethyl borate and trimethyl borate.

2. The catalyst composition as claimed in claim 1, wherein the organo-aluminum co-catalyst is at least one selected from the group consisting of triethylaluminum, tridecylaluminum, tri-n-butylaluminum, tri-isopropylaluminum, tri-isoprenylaluminum, tri-isobutylaluminum, ethyl aluminum sesquichloride, diethylaluminum chloride, di-isobutyl aluminum chloride, triphenylaluminum, tri-n-octylaluminum and tri-n-decylaluminum.

3. The catalyst composition as claimed in claim 1, wherein the mole ratio of the amount of the organo-aluminum co-catalyst to the amount of titanium component represented as elemental titanium ranges from 500:1 to 10:1.

4. The Ziegler-Natta catalyst composition as claimed in claim 1, wherein the mole ratio of the amount of the organo-aluminum co-catalyst to the amount of the external electron donor ranges from 1:1 to 50:1.

5. A process for ethylene polymerization in the presence of the Ziegler-Natta catalyst composition as claimed in claim 1; said process comprising preparing a slurry of the Ziegler-Natta catalyst composition in a hydrocarbon solvent in a reactor and introducing ethylene in the reactor to attain a predetermined pressure followed by subjecting ethylene to polymerization at a temperature ranging from 50° C. to 100° C. for a time period ranging from 10 minutes to 120 minutes to obtain polyethylene.

6. The process as claimed in claim 5, wherein the predetermined pressure of the ethylene ranges from 3 Kg/cm2 to 10 Kg/cm$^2$.

7. The process as claimed in claim 5, wherein the polymerization is carried out in the presence of a chain transfer agent.

8. The process as claimed in claim 7, wherein said chain transfer agent is hydrogen.

* * * * *

UNITED STATES PATENT AND TRADEMARK OFFICE
CERTIFICATE OF CORRECTION

PATENT NO. : 10,344,103 B2  
APPLICATION NO. : 15/510665  
DATED : July 9, 2019  
INVENTOR(S) : Virendrakumar Gupta et al.

Page 1 of 1

It is certified that error appears in the above-identified patent and that said Letters Patent is hereby corrected as shown below:

At Column 13, Line 8, change "ranges from 3 Kg/cm2 to" to --ranges from 3 Kg/cm$^2$ to--

Signed and Sealed this  
Fourteenth Day of April, 2020

Andrei Iancu  
*Director of the United States Patent and Trademark Office*